US012027300B2

(12) United States Patent
Sato et al.

(10) Patent No.: US 12,027,300 B2
(45) Date of Patent: Jul. 2, 2024

(54) INDUCTOR WITH WINDING THAT INCLUDES EXTENDED PORTIONS HAVING A TWIST

(71) Applicant: Murata Manufacturing Co., Ltd., Kyoto-fu (JP)

(72) Inventors: Kozo Sato, Nagaokakyo (JP); Hiroshi Okuizumi, Nagaokakyo (JP); Yoshiharu Satou, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 18/171,141

(22) Filed: Feb. 17, 2023

(65) Prior Publication Data

US 2023/0207183 A1 Jun. 29, 2023

Related U.S. Application Data

(62) Division of application No. 16/830,048, filed on Mar. 25, 2020, now Pat. No. 11,626,240.

(30) Foreign Application Priority Data

Mar. 26, 2019 (JP) ................................ 2019-059256

(51) Int. Cl.
*H01F 27/28* (2006.01)
*H01F 27/24* (2006.01)
(Continued)

(52) U.S. Cl.
CPC ......... *H01F 27/2823* (2013.01); *H01F 27/24* (2013.01); *H01F 27/29* (2013.01); *H01F 41/0246* (2013.01); *H01F 41/061* (2016.01)

(58) Field of Classification Search
CPC ...... H01F 27/2823; H01F 27/24; H01F 27/29; H01F 41/0246; H01F 41/061; H01F 3/10;
(Continued)

(56) References Cited

U.S. PATENT DOCUMENTS

2017/0323718 A1* 11/2017 Foley .................. H01F 27/2828
2018/0308609 A1 10/2018 Shinohara et al.
2019/0304659 A1* 10/2019 Tonogai ............. H01F 27/2823

FOREIGN PATENT DOCUMENTS

CN 108735426 A 11/2018
CN 109416979 A 3/2019
(Continued)

OTHER PUBLICATIONS

An Office Action mailed by China National Intellectual Property Administration on Jul. 5, 2021 which corresponds to Chinese Patent Application No. 202010211185.6 and is related to U.S. Appl. No. 16/830,048.

*Primary Examiner* — Lincoln D Donovan
*Assistant Examiner* — Alex W Lam
(74) *Attorney, Agent, or Firm* — Studebaker & Brackett PC

(57) ABSTRACT

An inductor includes a body that includes a coil and that contains a magnetic portion in which the coil is embedded, and a pair of outer electrodes that is disposed on a mounting surface of the body. The coil includes a winding portion formed by winding a conductive wire that has a coating layer and that has a pair of wide surfaces, and a pair of extended portions that extends from the winding portion. The pair of extended portions includes a twisted portion that is connected to the winding portion. The twisted portion is twisted about a virtual center line of an end portion of the winding portion, and a twisted part bends toward the mounting surface about an axis substantially perpendicular to the wide surfaces at the end portion. End portions of the pair of extended portions near the mounting surface are connected to the pair of outer electrodes.

20 Claims, 9 Drawing Sheets

(51) Int. Cl.
*H01F 27/29* (2006.01)
*H01F 41/02* (2006.01)
*H01F 41/061* (2016.01)

(58) Field of Classification Search
CPC ............... H01F 2017/048; H01F 17/04; H01F 27/2852; H01F 27/292; H01F 27/2847; H01F 27/34; H01F 17/045; H01F 27/006; H01F 27/255; H01F 27/28; H01F 19/08; H01F 27/2828
See application file for complete search history.

(56) References Cited

FOREIGN PATENT DOCUMENTS

| | | | |
|---|---|---|---|
| JP | 2007-173573 | A | 7/2007 |
| JP | 2015-225887 | A | 12/2015 |
| JP | 2018-182201 | A | 11/2018 |

* cited by examiner

INDUCTOR WITH WINDING THAT INCLUDES EXTENDED PORTIONS HAVING A TWIST

CROSS-REFERENCE TO RELATED APPLICATION

This application is a Divisional of U.S. patent application Ser. No. 16/830,048 filed Mar. 25, 2020, which claims benefit of priority to Japanese Patent Application No. 2019-059256, filed Mar. 26, 2019, the entire content of which is incorporated herein by reference.

BACKGROUND

Technical Field

The present disclosure relates to an inductor.

Background Art

In recent years, small inductors that have excellent current characteristics have been need. One of such inductors includes a winding portion around which a conductive wire a section of which has a straight angle shape is wound in a direction from an inner circumference toward an outer circumference, and an extended portion that extends from the winding portion. The extended portion of the inductor is exposed from a surface of a body and connected to an outer electrode. Among such inductors, a proposed inductor includes an extended portion that bends in a body and exposed from the bottom surface of the body in order to decrease a region of the body that is occupied by the extended portion and to decrease the size, as described, for example, in Japanese Unexamined Patent Application Publication No. 2015-225887.

SUMMARY

In the inductor, however, a coil is formed by using the conductive wire that has the straight angle shape, and the conductive wire at the extended portion of the coil bends only in a line width direction thereof. Accordingly, a strong force is applied to a part of the conductive wire at the extended portion. Consequently, there is a possibility that as the size of the inductor decreases, the force that is applied to the part of the conductive wire at the extended portion increases, and the part is damaged.

Accordingly, the present disclosure provides an inductor that includes a coil embedded in a body and outer terminals to which extended portions of the coil are connected and that can prevent a conductive wire at the extended portions from being damaged by dispersing a force that is applied thereto in multiple directions.

According to preferred embodiments of the present disclosure, an inductor includes a body that includes a coil and that contains a magnetic material in which the coil is embedded, and a pair of outer electrodes that is disposed on a mounting surface of the body. The coil includes a winding portion formed by winding a conductive wire that has a coating layer and that has a pair of wide surfaces, and a pair of extended portions that extends from the winding portion. The pair of extended portions includes a twisted portion that is connected to the winding portion. The twisted portion is twisted about a virtual center line of an end portion of the winding portion, and a twisted part bends toward the mounting surface about an axis substantially perpendicular to the pair of wide surfaces at the end portion. End portions of the pair of extended portions near the mounting surface are connected to the pair of outer electrodes.

According to an aspect of the present disclosure, an inductor that includes a coil embedded in a body and outer terminals that are connected to extended portions of the coil enables a force that is applied to a conductive wire at the extended portions to disperse in multiple directions for prevention of damage.

Other features, elements, characteristics and advantages of the present disclosure will become more apparent from the following detailed description of preferred embodiments of the present disclosure with reference to the attached drawings.

DETAILED DESCRIPTION

Figure 1A:
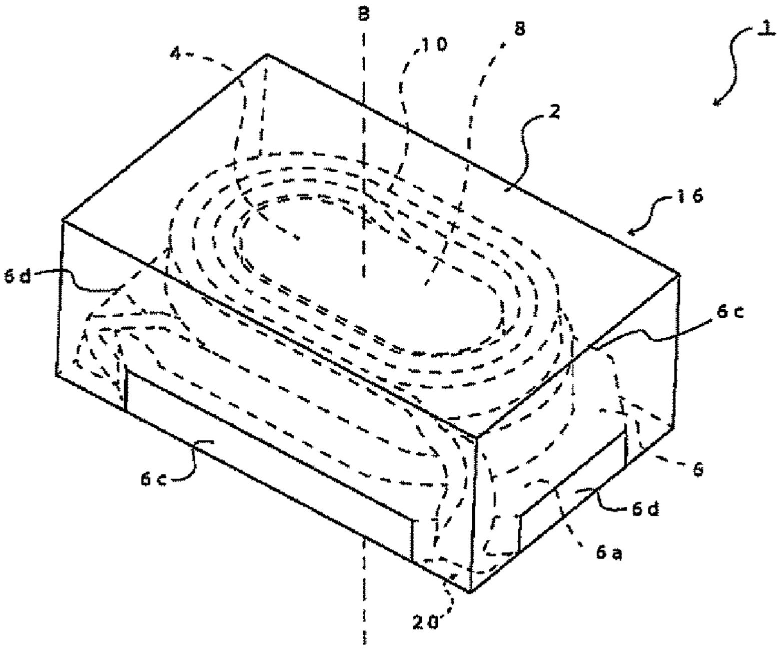
FIG. 1A is a perspective view of an inductor according to a first embodiment.

Embodiments, or examples, for carrying out the present disclosure will hereinafter be described with reference to the drawings. Inductors will be described below to embody the technical concept of the present disclosure, and the present disclosure is not limited to the following description unless there is no specific description.

In the drawings, some members that have like functions are designated by like reference characters. Structures described according to different embodiments, or examples, can be partially replaced or combined, although the embodiments, or examples, are separately described for convenience in consideration for ease of a description or understanding of main points in some cases. According to the embodiments, or examples, described later, already described common matters are omitted, and only different matters are described. In particular, like effects with like structures are not described for every embodiment, or example. The size of components and positional relationship therebetween are exaggeratedly illustrated in the drawings for clarity of a description in some cases. In the following description, terms (for example, "above", "below", "right", "left", "vertical direction", "horizontal direction", and other terms containing these terms) that represent specific directions or positions are used as needed. The terms are used to make the disclosure easy to understand with reference to the drawings, and the technical scope of the present disclosure is not limited by the meaning of the terms.

1. First Embodiment

An inductor 1 according to a first embodiment of the present disclosure will now be described with reference to FIG. 1A to FIG. 4B.

Figure 1B:
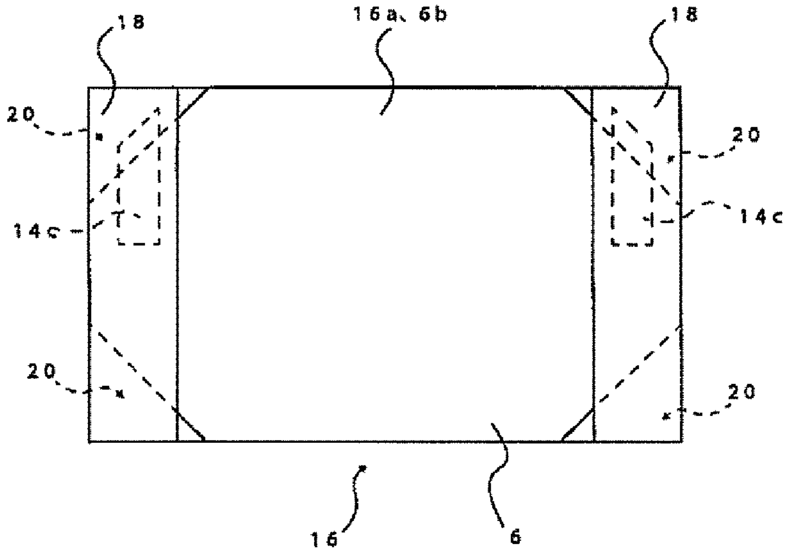
FIG. 1B is a bottom view of the inductor illustrated in FIG. 1A.
Figure 2A:
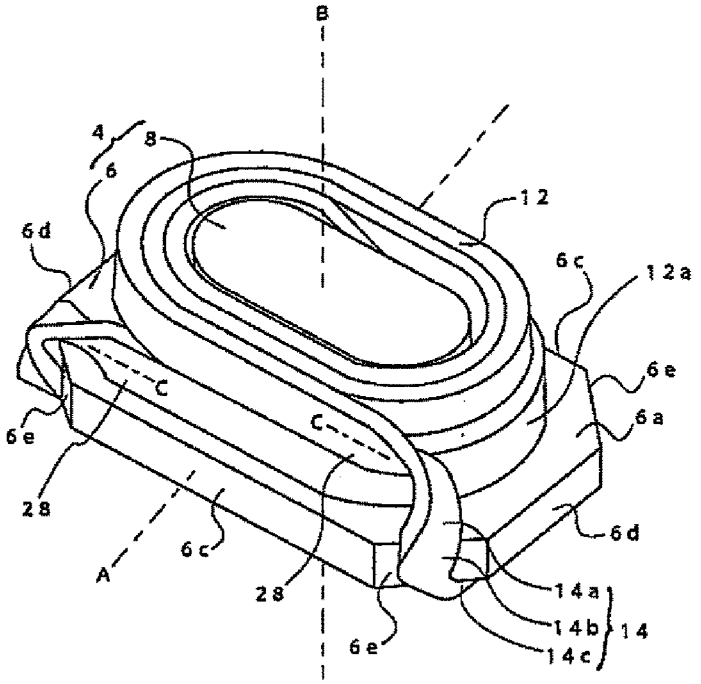
FIG. 2A is a perspective view of a core and a coil that are included in the inductor illustrated in FIG. 1A when the core and the coil are viewed from above.
Figure 2B:
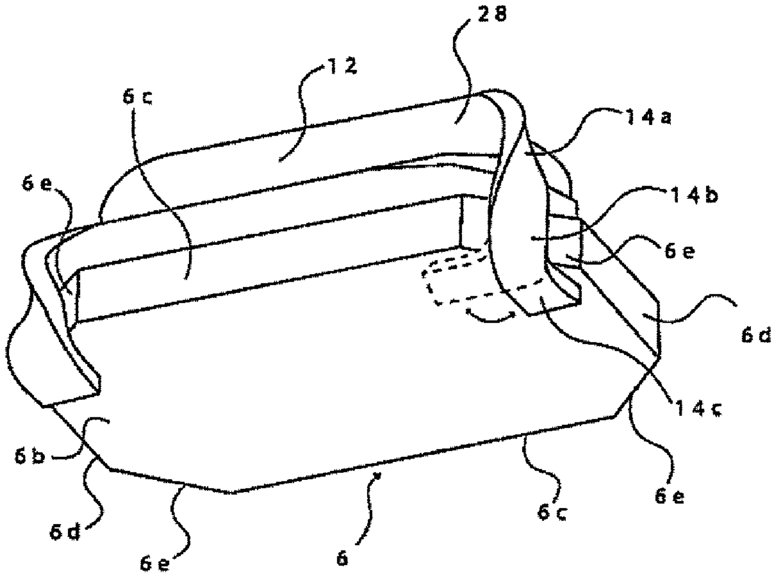
FIG. 2B is a perspective view of the core and the coil of the inductor illustrated in FIG. 1A when the core and the coil are viewed from below.
Figure 3:
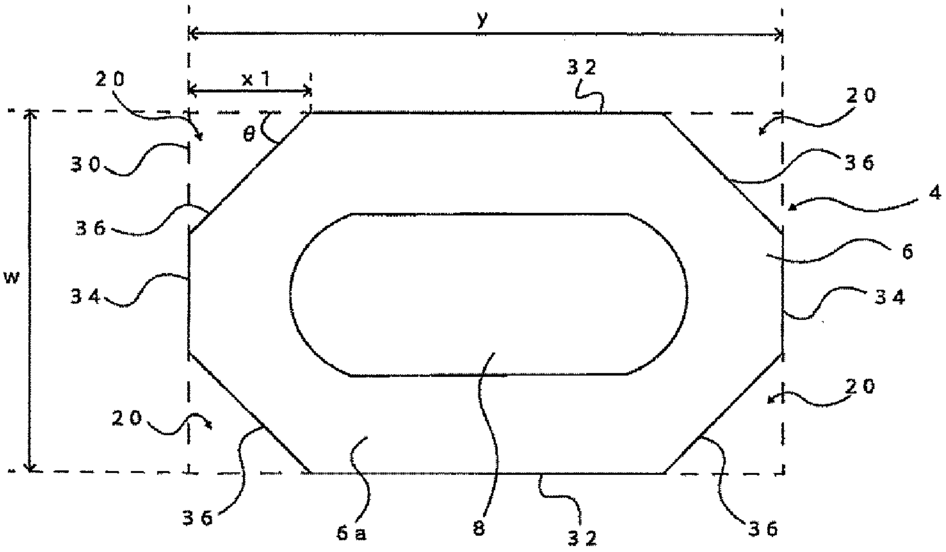
FIG. 3 is a top view of the core of the inductor illustrated in FIG. 1A.
Figure 4A:
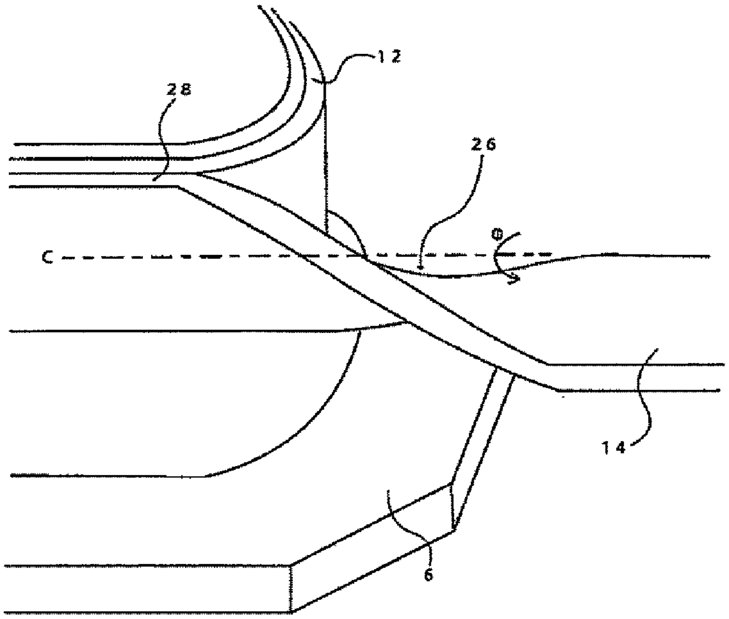
FIG. 4A is an enlarged perspective view of a twisted portion of the inductor illustrated in FIG. 1A to describe a process of forming the twisted portion.
Figure 4B:
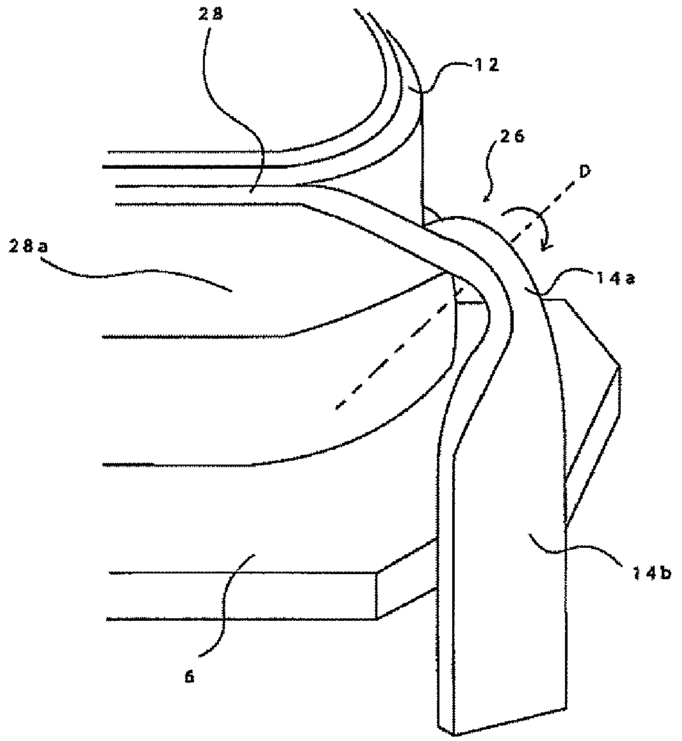
FIG. 4B is an enlarged perspective view of the twisted portion of the inductor illustrated in FIG. 1A to describe the process of forming the twisted portion.

FIG. 1A is a perspective view of the inductor 1 according to the first embodiment of the present disclosure. FIG. 1B is a bottom view of the inductor 1 illustrated in FIG. 1A. FIG. 2A is a perspective view of a core 4 and a coil 10 that are included in the inductor 1 illustrated in FIG. 1A when the core and the coil are viewed from above. FIG. 2B is a perspective view of the core and the coil of the inductor 1 illustrated in FIG. 1A when the core and the coil are viewed from below. FIG. 3 is a top view of the core of the inductor 1 illustrated in FIG. 1A. FIG. 4A and FIG. 4B illustrate enlarged perspective views of a twisted portion 14*a* of the inductor 1 illustrated in FIG. 1A to describe a process of forming the twisted portion 14*a*.

The inductor 1 according to the present embodiment includes a body 16 that includes the core 4 and the coil 10 and that contains a magnetic portion 2, and outer electrodes 18.

The core 4 includes a plate-like base 6 that has an upper surface 6*a* and a lower surface 6*b* and a pillar-shaped portion 8 that is disposed on the upper surface 6*a* of the base 6. The base 6 also has side surfaces 6*c* and 6*d* that connect the upper surface 6*a* and the lower surface 6*b* to each other and notch surfaces 6*e*. The notch surfaces 6*e* are located between the side surfaces 6*c* and the side surfaces 6*d*. The core 4 has the two side surfaces 6*c* in a longitudinal direction, the two side surfaces 6*d* in a transverse direction, and the four notch surfaces 6*e* between the side surfaces 6*c* and the side surfaces 6*d* as described later.

The coil 10 is formed by using a conductive wire (a so-called rectangular wire) that has a rectangular sectional shape and includes a winding portion 12 and a pair of extended portions 14 that extends from the winding portion 12. The winding portion 12 is formed by winding the conductive wire around the pillar-shaped portion 8. Each extended portion 14 includes a twisted portion 14*a* that is connected to the winding portion 12. The extended portion 14 bends due to the twisted portion 14*a* and extends from a position near the upper surface 6*a* of the base toward the lower surface 6*b*. In this case, the extended portion 14 extends along the corresponding notch surface 6*e* of the base 6 toward the lower surface 6*b* of the base 6.

The magnetic portion 2 covers a region above the upper surface 6*a* of the base and regions adjacent to the notch surfaces 6*e*. More specifically, the magnetic portion 2 covers a portion except for the pillar-shaped portion 8 of the core 4, the upper surface 6*a* and the notch surfaces 6*e* of the base 6 of the core 4, the winding portion 12 of the coil 10, and end portions of the extended portions 14 of the coil 10. The end portions of the extended portions 14 that are not covered by the magnetic portion 2 are electrically connected to the outer electrodes 18 that are formed on a surface of the body 16.

Components and the arrangement thereof will be described below in detail.

The core 4, the coil 10, and the magnetic portion 2 that are included in the body 16 will now be described.

Core

The core 4 includes the base 6 and the pillar-shaped portion 8.

The base 6 has the upper surface 6*a*, the lower surface 6*b* opposite the upper surface 6*a*, the side surfaces that connect the upper surface 6*a* and the lower surface 6*b* to each other, and the notch surfaces 6*e*. The side surfaces include the two side surfaces 6*c* in the longitudinal direction and the two side surfaces 6*d* in the transverse direction. Each notch surface 6*e* is located between one of the side surfaces 6*c* in the longitudinal direction and one of the side surfaces 6*d* in the transverse direction and connects the two side surfaces 6*c* and 6*d* to each other. That is, as illustrated in FIG. 3, the base 6 has a substantially rectangular shape that is obtained by cutting four corners of a rectangle 30 along straight lines 36 and that has sides 32 in the longitudinal direction and sides 34 in the transverse direction when viewed from above. In this case, as illustrated in FIG. 2A and FIG. 2B, the sides 32 in the longitudinal direction are included in the shape of the side surfaces 6*c* of the base 6 in the longitudinal direction when viewed from above. As illustrated in FIG. 2A and FIG. 2B, the sides 34 in the transverse direction are included in the shape of the side surfaces 6*d* of the base 6 in the transverse direction when viewed from above. As illustrated in FIG. 2A and FIG. 2B, the straight lines 36 are included in the shape of the notch surfaces 6*e* when viewed from above.

A length y of the base 6 in the longitudinal direction is, for example, about 1 to 12 mm. A length w thereof in the transverse direction is, for example, about 1 to 12 mm.

To make a description of the shape of the base 6 easy to understand, regions that are defined by the corners of the rectangle 30 and the straight lines 36 in FIG. 3 are referred to as notch regions 20.

Each notch region 20 has a right triangle shape. Of two acute angles of the notch region 20, an angle θ between the corresponding straight line 36 and a side of the notch region 20 in the longitudinal direction is no less than 20 degrees and no more than 45 degrees (i.e., from 20 degrees to 45 degrees). The side of the notch region 20 in the longitudinal direction coincides with an extension of the corresponding side 32 of the rectangle 30 in the longitudinal direction. That is, the angle θ between each notch surface 6*e* and an extension of the corresponding side surface 6*c* of the base in the longitudinal direction is no less than 20 degrees and no more than 45 degrees (i.e., from 20 degrees to 45 degrees).

According to the present embodiment, the maximum length x1 of the notch region 20 in the longitudinal direction is no less than 10% and no more than 30% (i.e., from 10% to 30%) of the length y (the length of the rectangle 30 in the longitudinal direction) of the base 6 in the longitudinal direction. This means that the length of the straight line 36 in the longitudinal direction is no less than 10% and no more than 30% (i.e., from 10% to 30%) of the length y of the base 6 in the longitudinal direction.

The pillar-shaped portion 8 is disposed on the upper surface 6*a* of the base 6 along a central axis extending in a direction substantially perpendicular to the upper surface 6*a*. The central axis substantially coincides with a central axis B of the inductor 1 in the vertical direction. The length of the pillar-shaped portion 8 (the height of the pillar-shaped portion 8) along the central axis is, for example, about 0.5 to 4.5 mm.

For example, the base 6 and the pillar-shaped portion 8 that are included in the core 4 are integrally formed by molding.

The material of the core 4 is a mixture of magnetic powder and a resin. The ratio of the magnetic powder added is, for example, 60 weight % or more, preferably 80 weight % or more. Examples of the magnetic powder include magnetic metal powder of iron such as Fe, Fe—Si—Cr, Fe—Ni—Al, Fe—Cr—Al, Fe—Si, Fe—Si—A, Fe—Ni, and Fe—Ni—Mo, magnetic metal powder of another composition, magnetic metal powder of an amorphous material, magnetic metal powder a surface of which is covered by an insulating material such as glass, magnetic metal powder a surface of which is modified, and fine magnetic metal powder at a nano-level. Examples of the resin include thermosetting resins such as an epoxy resin, a polyimide resin, and a phenolic resin, and thermoplastic resins such as a polyethylene resin and a polyamide resin.

Coil

The coil 10 includes the winding portion 12 that has a coating layer that has an insulating property on a surface and an adhesive layer on a surface of the coating layer and a pair of extended portions 14 that extends from the winding portion 12, and the winding portion 12 is formed by winding the conductive wire (the so-called rectangular wire) that has a pair of wide surfaces 12*a* and that has a rectangular sectional shape around the pillar-shaped portion 8 of the core 4.

Winding Portion

The winding portion 12 is formed by winding the conductive wire around the pillar-shaped portion 8 of the core 4 so as to form two steps such that the end portions of the conductive wire are located at the outer circumference and the conductive wire is continuous at the inner circumference. At this time, as illustrated in FIG. 2A, the winding portion 12 is wound around the pillar-shaped portion 8 such that the width direction of the wide surfaces 12*a* is substantially parallel to the direction in which the pillar-shaped portion 8 extends (the direction in which the central axis B of the inductor 1 extends), and one of the wide surfaces 12*a* faces the side surface of the pillar-shaped portion 8. Accordingly, a virtual center line C of each of end portions 28 that are located at the outer circumference of the winding portion 12 is substantially perpendicular to the central axis B of the inductor. The virtual center line C corresponds to the central axis of the conductive wire. The winding axis of the winding portion 12 coincides with the central axis B of the inductor 1.

Extended Portion

Each extended portion 14 includes the twisted portion 14*a* that is connected to the corresponding end portion 28 that is located at the outer circumference of the winding portion 12, and an extension portion 14*b* that is connected to the twisted portion 14*a*, and a terminal 14*c* that is connected to the extension portion 14*b*. The extended portion 14 bends due to the twisted portion 14*a* and extends from a position near the upper surface 6*a* of the base 6 toward the lower surface 6*b*. In this case, the extended portion 14 extends along the corresponding notch surface 6*e* of the base 6 toward the lower surface 6*b* of the base 6. The extended portions 14 are line-symmetrical to each other with respect to a central axis A of the inductor that is perpendicular to the central axis B (that is, the winding axis of the winding portion 12) of the inductor 1 and that extends in the horizontal direction.

A method of forming the twisted portion 14*a* will be described with reference to FIG. 4A and FIG. 4B. The extended portion 14 that bends due to the twisted portion 14*a* will be described in detail. FIG. 4A and FIG. 4B illustrate enlarged perspective views of the twisted portion 14*a* of the inductor 1 to describe a process of forming the twisted portion 14*a* of the inductor 1.

As illustrated in FIG. 4A, the extended portion 14 that extends from the winding portion 12 is first twisted at a predetermined angle $\varphi$ about the virtual center line C of the end portion 28 that is located at the outer circumference of the winding portion 12. According to the present embodiment, the predetermined twist angle $\varphi$ is no less than 90 degrees and no more than 180 degrees (i.e., from 90 degrees to 180 degrees). Subsequently, as illustrated in FIG. 4B, a twisted part 26 that is twisted about the virtual center line C is bent toward the base 6 about an axis D substantially perpendicular to a wide surface 28*a* of the end portion 28 that is located at the outer circumference of the winding portion 12. According to the present embodiment, an angle (bending angle) at which the twisted part 26 is bent is about 90 degrees.

The twisted portion 14*a* thus formed causes the extended portion 14 to bend in a direction (the vertical direction of the inductor 1) that differs from the direction (the horizontal direction of the inductor 1) in which the end portion 28 that is located at the outer circumference of the winding portion 12 extends.

The extension portion 14*b* is connected to the twisted portion 14*a* and extends in a substantially vertical direction of the inductor 1. As illustrated in FIG. 2A and FIG. 2B, at least a part of the extension portion 14*b* is in contact with the notch surface 6*e* of the base 6.

As illustrated in FIG. 2B, the terminal 14*c* is connected to the extension portion 14*b*, and a wide surface of the terminal 14*c* is in contact with the lower surface 6*b* of the base 6. That is, the direction in which the terminal 14*c* extends is substantially perpendicular to the direction in which the extension portion 14*b* extends. As illustrated by a dashed line and a double-headed arrow in FIG. 2B, the direction in which the terminal 14*c* extends is set to a direction between the longitudinal direction and the transverse direction of the base 6 depending on the above angle $\varphi$ and/or the degree of twist with respect to the extension portion 14*b*. The terminal 14*c* at which the coating layer and the adhesive layer on the surface of the conductive wire are removed is electrically connected to the corresponding outer electrode 18 that is formed on the surface of the body 16.

The length in the width direction of the wide surfaces 12*a* of the conductive wire that forms the coil 10 is, for example, no less than 120 μm and no more than 2000 μm (i.e., from 120 μm to 2000 μm). The thickness thereof (length in the direction substantially perpendicular to the wide surfaces 12*a*) is, for example, no less than 10 μm and no more than 2000 μm (i.e., from 10 μm to 2000 μm). The thickness of the coating layer is, for example, no less than 2 μm and no more than 10 μm (i.e., from 2 μm to 10 μm), preferably about 6 μm. The coating layer is composed of an insulating resin such as a polyamide imide resin. The thickness of the adhesive layer is, for example, no less than 1 μm and no more than 3 μm (i.e., from 1 μm to 3 μm). The adhesive layer is composed of a thermoplastic resin or a thermosetting resin containing a self-adhesion component such that parts of the conductive wire that forms the winding portion can be secured.

Magnetic Portion

As illustrated in FIG. 1A, the magnetic portion 2 covers the pillar-shaped portion 8 of the core 4, the upper surface 6*a* and the notch surfaces 6*e* of the base 6 of the core 4, the winding portion 12 of the coil 10, and the twisted portions 14*a* and the extension portions 14*b* of the extended portions 14 of the coil 10 and has a substantially rectangular cuboid shape. The side surfaces 6*c* and 6*d* of the base 6 in the longitudinal direction and in the transverse direction, the lower surface 6*b* of the base 6, and the terminals 14*c* of the extended portions 14 of the coil 10 are not covered by the magnetic portion 2 but are exposed. That is, the inductor 1 has a substantially rectangular cuboid shape that has substantially the same lengths as the lengths of the base 6 in the longitudinal direction and in the transverse direction and that has a rectangular bottom.

The magnetic portion 2 is formed by molding a mixture of magnetic powder and a resin under pressure. The ratio of the magnetic powder added in the mixture is, for example, 60 weight % or more, preferably 80 weight % or more. Examples of the magnetic powder include magnetic metal powder of iron such as Fe, Fe—Si—Cr, Fe—Ni—Al, Fe—Cr—Al, Fe—Si, Fe—Si—A, Fe—Ni, and Fe—Ni—Mo, magnetic metal powder of another composition, magnetic metal powder of an amorphous material, magnetic metal powder a surface of which is covered by an insulating material such as glass, magnetic metal powder a surface of which is modified, and fine magnetic metal powder at a nano-level. Examples of the resin include thermosetting resins such as an epoxy resin, a polyimide resin, and a phenolic resin, and thermoplastic resins such as a polyethylene resin and a polyamide resin. For the magnetic powder of the magnetic portion 2 and the magnetic powder of the core 4, materials having the same composition may be used. The ratio of the magnetic powder added in the magnetic portion 2 may be smaller than the ratio of the magnetic powder added in the core 4.

Outer Electrode

Each outer electrode 18 covers the corresponding terminal 14*c* that is exposed from the magnetic portion 2. The outer electrode 18 is formed by, for example, plating and has a first layer composed of nickel and a second layer that is formed on the first layer and that is composed of tin.

The inductor according to the present embodiment thus includes the coil 10, the body 16 that contains the magnetic portion 2 in which the coil 10 is embedded, and a pair of the outer electrodes 18 that is disposed on the mounting surface 16*a* of the body 16. The coil 10 includes the winding portion 12 formed by winding the conductive wire that has the coating layer and that has the pair of wide surfaces, and the extended portions 14 that extend from the end portions 28 that are located at the outer circumference of the winding portion 12. The extended portions 14 include the twisted portions 14*a* that are connected to the winding portion 12. The twisted portions 14*a* are twisted about the virtual center lines C of the end portions 28 of the winding portion 12 that are located at the outer circumference. The twisted parts 26 bend toward the mounting surface 16*a* about the axis D substantially perpendicular to the wide surfaces at the end portions 28. The end portions of the extended portions 14 near the mounting surface 16*a* are connected to the outer electrodes 18.

Effects

In the inductor with this structure, due to the twisted portions 14*a* that are formed by being twisted and bent, the extended portions 14 bend in the direction (the vertical direction of the inductor) that differs from the direction (the horizontal direction of the inductor) in which the end portions 28 that are located at the outer circumference of the winding portion 12 extend. This enables the force that is applied to the conductive wire at the extended portions 14 to disperse in multiple directions. Accordingly, even when the extended portions 14 are bent in the body 16 in a desired direction in the inductor that has a decreased size, the conductive wire at the extended portions 14 can be prevented from being damaged.

In the inductor with the above structure, the base 6 of the core 4 has the notch surfaces 6*e*, the notch surfaces 6*e* are covered by the magnetic portion 2, and the side surfaces 6*c* and 6*d* of the base 6 are not covered by the magnetic portion 2 but exposed. This increases the strength of adhesion between the base 6 and the magnetic portion 2 in a manner in which the dimensions of the inductor in the horizontal direction are maintained to be substantially the same as the dimensions of the base 6 in the horizontal direction, and the magnetic portion 2 covers not only the upper surface 6*a* of the base 6 but also the notch surfaces 6*e*. That is, the inductor 1 according to the present embodiment has a decreased size and increases the strength of adhesion between the components (the core 4 and the magnetic portion 2) of the inductor. The magnetic portion 2 covers the notch surfaces 6*e* and protrudes downward form the upper surface 6*a* of the base 6 to form protruding portions. The protruding portions function as an anchor for the base 6 and increases the strength of adhesion between the core 4 and the magnetic portion 2.

In the inductor with the above structure, the notch surfaces 6*e* are formed at the four corners of the rectangle 30. That is, the notch surfaces 6*e* are located at the farthest positions from the outer circumference of the winding portion 12 of the coil 10. Consequently, the notch surfaces 6*e* less affect the magnetic flux of the coil 10.

In the inductor with the above structure, the angle θ between the straight line 36 and the side of the notch region 20 in the longitudinal direction in the triangle shape of each notch region 20 is no less than 20 degrees and no more than 45 degrees (i.e., from 20 degrees to 45 degrees). A small angle θ facilitates the formation of each notch region 20, that is, the formation of each notch surface 6*e*. A large angle θ increases the area of each notch surface 6*e* and increases the strength of adhesion between the core 4 and the magnetic portion 2. In addition, a large angle θ increases the dimensions of each notch region 20. This means that a space in which each extended portion 14 extends from a position near the upper surface 6*a* of the base 6 toward the lower surface 6*b* is expanded, and the extended portion 14, particularly, the extension portion 14*b* is easy to be contained in the notch region 20. That is, the extended portion 14 that is disposed in the notch region 20 is likely to be prevented from being exposed from the surface of the body 16. Accordingly, the angle θ that is set in the above range facilitates the formation of the inductor and enables the strength of adhesion between the core 4 and the magnetic portion 2 to be maintained.

In the inductor with the above structure, the direction in which the terminals 14*c* that are disposed on the lower surface 6*b* of the base 6 extend can be set to be a direction between the longitudinal direction and the transverse direction of the base 6. This enables the direction in which the terminals 14*c* extend can be adjusted depending on the arrangement of the outer electrodes 18 that are formed on the surface of the body 16, and the outer electrodes 18 and the terminals 14*c* can be sufficiently brought into contact with each other for energizing.

In the inductor with the above structure, the winding portion 12 of the coil 10 is wound around the pillar-shaped portion 8 of the core 4. This improves the accuracy of the arrangement of the coil 10 in the body 16.

In the inductor with the above structure, the extension portions 14*b* are in contact with the notch surfaces 6*e*. This enables reproducibility of the twist angle φ and the bending angle to be increased when the twisted portions 14*a* of the extended portions 14 are formed.

2. Second Embodiment

Figure 5:
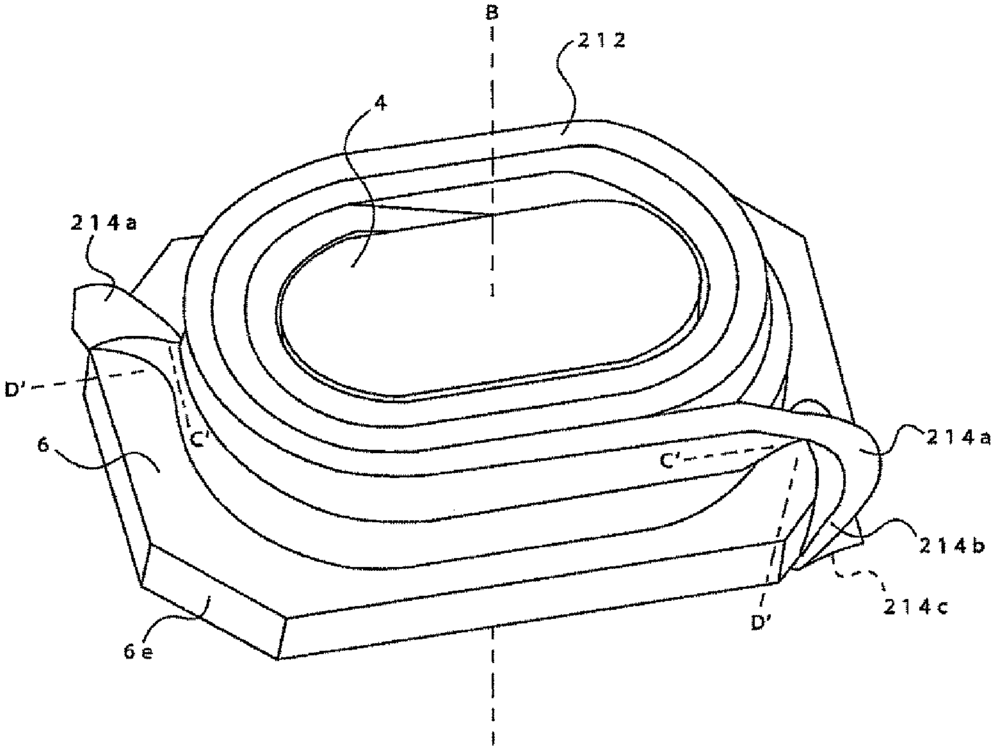
FIG. 5 is a perspective view of a core and a coil that are included in an inductor according to a second embodiment when the core and the coil are viewed from above.

An inductor according to a second embodiment of the present disclosure will now be described with reference to FIG. 5. FIG. 5 is a schematic perspective view of a core and a coil that are included in the inductor according to the second embodiment.

The inductor according to the second embodiment differs from the inductor according to the first embodiment in that two twisted portions 214*a* are substantially point-symmetrical to each other with respect to the central axis B of the inductor in the vertical direction, that is, the winding axis of the winding portion of the coil.

In the inductor according to the second embodiment, the twisted portions 214*a* are twisted at a predetermined angle about virtual center lines C' of end portions 228 that are located at the outer circumference of a winding portion 212, and twisted parts thereof bend toward the base 6 about an axis D' substantially perpendicular to the wide surfaces at the end portions 228 that are located at the outer circumference of the winding portion 212. The predetermined angle (twist angle) at which the twisted portions 214*a* are twisted is no less than 90 degrees and no more than 180 degrees (i.e., from 90 degrees to 180 degrees). The angle (bending angle) at which the twisted parts bend about the axis D' is about 90 degrees.

Effects

In the inductor with this structure, the twisted portions 214*a* are substantially point-symmetrical to each other with respect to the central axis B of the inductor, that is, the winding axis of the winding portion of the coil. This enables the number of turns of the conductive wire of the winding portion 212 to be adjusted in a unit of ½ turns.

3. Other Embodiments

According to the above embodiments, as illustrated in FIG. 3, the base 6 of the core 4 has the substantially rectangular shape that is obtained by cutting the four corners of the rectangle 30 linearly. However, the shape of the base 6 is not limited thereto. A modification to the base 6 will now be described.

First Modification

Figure 6A:
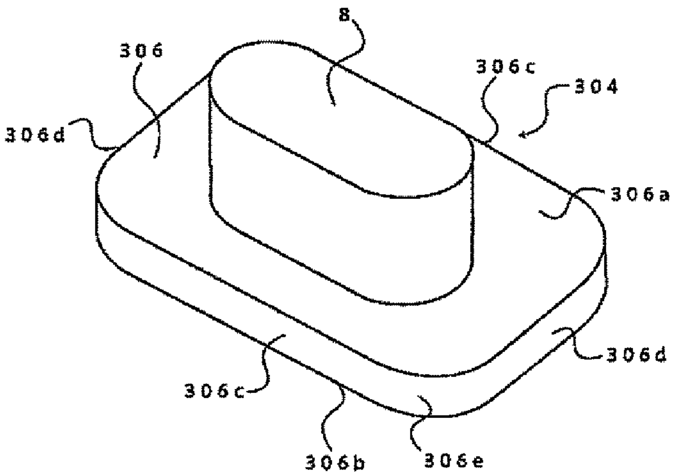
FIG. 6A is a perspective view of a base according to a first modification.
Figure 6B:
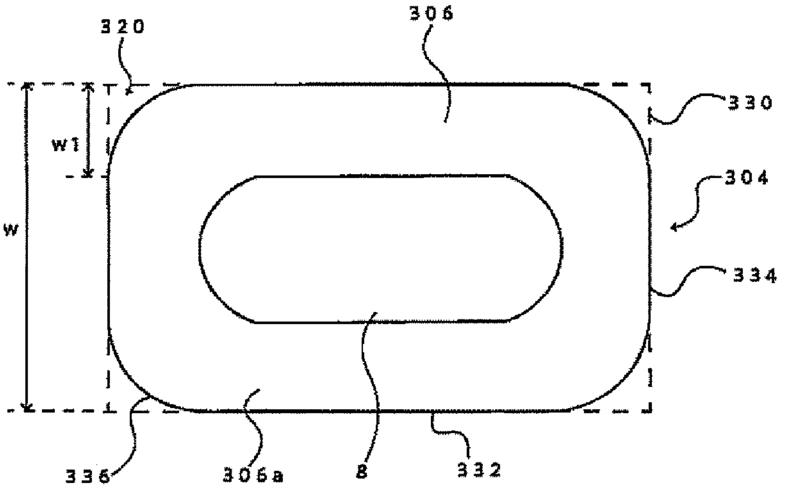
FIG. 6B is a top view of the base according to the first modification.

The shape of a base 306 of a core 304 according to a first modification will be described with reference to FIG. 6A and FIG. 6B. FIG. 6A illustrates the base according to the first modification. FIG. 6B is a top view of the base according to the modification.

The base 306 according to the first modification has an upper surface 306*a*, a lower surface 306*b* opposite the upper surface 306*a*, side surfaces that connect the upper surface 306*a* and the lower surface 306*b* to each other, and notch surfaces 306*e*. The side surfaces include two side surfaces 306*c* in the longitudinal direction and two side surfaces 306*d* in the transverse direction. Each notch surface 306*e* is located between one of the side surfaces 306*c* in the longitudinal direction and one of the side surfaces 306*d* in the transverse direction and connects the side surfaces 306*c* in the longitudinal direction and the side surfaces 306*d* in the transverse direction to each other. The notch surface 306*e* is a curved surface and curved into a convex shape extending in a direction from the center of the core 304 toward the outside of the core 304. The notch surface 306*e* is curved only in the horizontal direction of the inductor 1. That is, as illustrated in FIG. 6B, the base 306 has a substantially rectangular shape that is obtained by cutting four corners of a rectangle 330 along curves 336 and that has sides 332 in the longitudinal direction and sides 334 in the transverse direction when viewed from above. In this case, as illustrated in FIG. 6A, the sides 332 in the longitudinal direction are included in the shape of the side surfaces 306*c* of the base 306 in the longitudinal direction when viewed from above. As illustrated in FIG. 6A, the sides 334 in the transverse direction are included in the shape of the side surfaces 306*d* of the base 306 in the transverse direction when viewed from above. As illustrated in FIG. 6A, the curves 336 are included in the shape of the notch surfaces 306*e* when viewed from above.

To make a description of the shape of the base 306 easy to understand, regions that are defined by a part of the rectangle 330 and the curves 336 in FIG. 6B are referred to as notch regions 320.

The maximum length w1 of the notch regions 320 in the transverse direction is shorter than half of the length of the inductor 1 in the transverse direction.

Effects

In the base 306 with this structure, the notch surfaces 306*e* are formed at the four corners of the rectangle 330. That is, the notch surfaces 306*e* are located at the farthest positions from the outer circumference of the winding portion 12 of the coil 10. Consequently, the notch surfaces 306*e* less affect the magnetic flux of the coil 10.

Second Modification

Figure 7A:
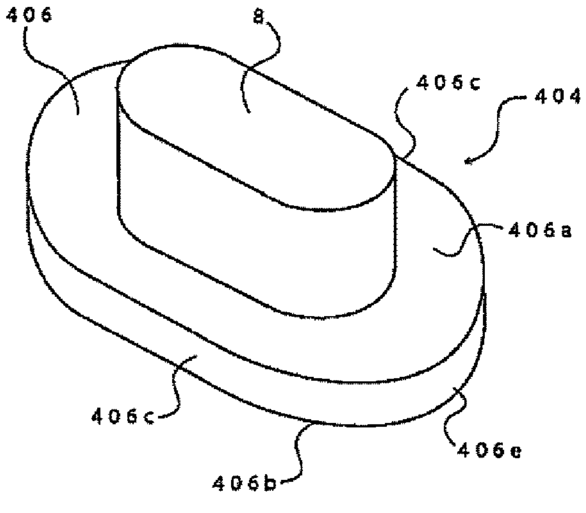
FIG. 7A is a perspective view of a base according to a second modification.
Figure 7B:
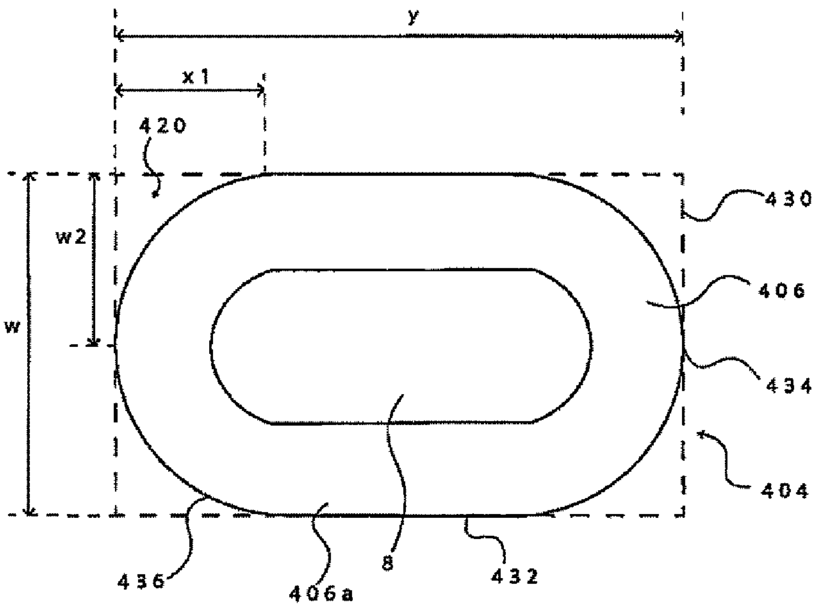
FIG. 7B is a top view of the base according to the second modification.
Figure 8:
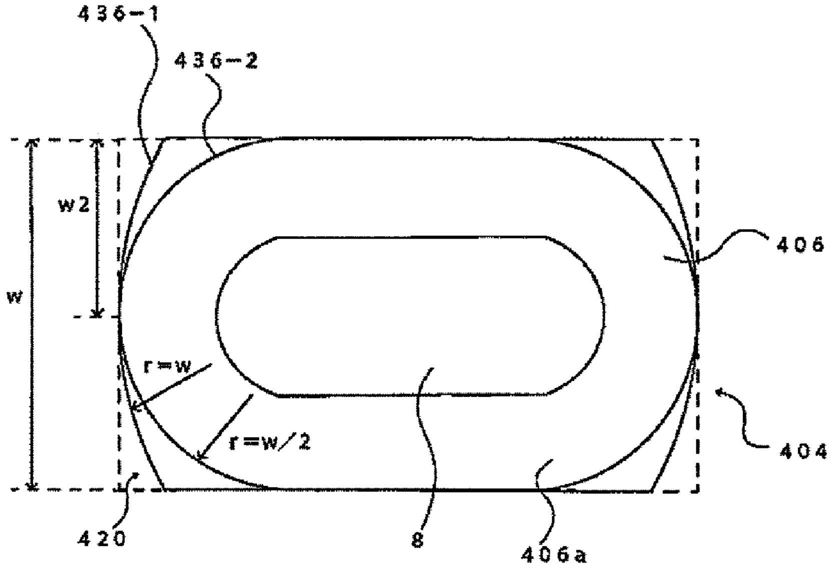
FIG. 8 is another top view of the base according to the second modification.

The shape of a base 406 of a core 404 according to a second modification will now be described with reference to FIG. 7A, FIG. 7B, and FIG. 8. FIG. 7A is a perspective view of the base according to the second modification. FIG. 7B and FIG. 8 illustrate top views of the base according to the second modification.

The base 406 according to the second modification has an upper surface 406*a*, a lower surface 406*b* opposite the upper surface 406*a*, side surfaces that connect the upper surface 406*a* and the lower surface 406*b* to each other, and notch surfaces 406*e*. The side surfaces include two side surfaces 406*c* in the longitudinal direction. Each notch surface 406*e* is a curved surface that is connected to the two side surfaces 406*c* in the longitudinal direction. The notch surface 406*e* is curved into a convex shape extending in a direction from the center of the core 404 toward the outside of the core 404. The notch surface 406*e* is curved only in the horizontal direction of the inductor 1. That is, as illustrated in FIG. 7B, the base 406 has a substantially rectangular shape that is obtained by cutting four corners of a rectangle 430 along curves 436 and that has sides 432 in the longitudinal direction and sides 434 in the transverse direction when viewed from above. The curves 436 adjacent to each other in the transverse direction are connected to each other. In this case, as illustrated in FIG. 7A, the sides 432 in the longitudinal direction are included in the shape of the side surfaces 406*c* of the base 406 in the longitudinal direction when viewed from above. As illustrated in FIG. 7A, the curved sides 434 in the transverse direction are included in the shape of the respective two notch surfaces 406*e* that are adjacent and connected to each other in the transverse direction when viewed from above.

To make a description of the shape of the base 406 easy to understand, regions that are defined by a part of the rectangle 430 and the curves 436 in FIG. 7B are referred to as notch regions 420.

The maximum length w2 of the notch regions 420 in the transverse direction is half of a length w of the base 406 in the transverse direction. That is, the notch surfaces 406*e* of the base 406 that are adjacent to each other in the transverse direction are connected to each other.

The maximum length x1 of the notch regions 420 in the longitudinal direction is no less than 10% and no more than 30% (i.e., from 10% to 30%) of the length y of the base 406 in the longitudinal direction when the base 406 is viewed from above. In this case, as illustrated by 436-1 in FIG. 8, a radius r1 of curvature of the curves when the length x1 is 10% of the length y is equal to the length w of the base 406 in the transverse direction. As illustrated by 436-2 in FIG. 8, a radius r2 of curvature of the curves when the length x1 is 30% of the length y is half of the length w of the base 406 in the transverse direction. The radius r of curvature of the curves is correlated with the length x1 and varies in a range of no less than r2 and no more than r1 (i.e., from r2 to r1) as the length x1 varies in a range of no less than 10% and no more than 30% (i.e., from 10% and no more to an 30%) of the length y of the base 406 in the longitudinal direction. The correlation relationship between the radius r of curvature of the curves and the length x1 is, for example, a proportional relationship.

Effects

The inductor that includes the base 406 with this structure can increase the areas of the notch surfaces 406*e* and can increase the strength of adhesion between the magnetic portion 2 and the core 4.

Third Modification

Figure 9A:
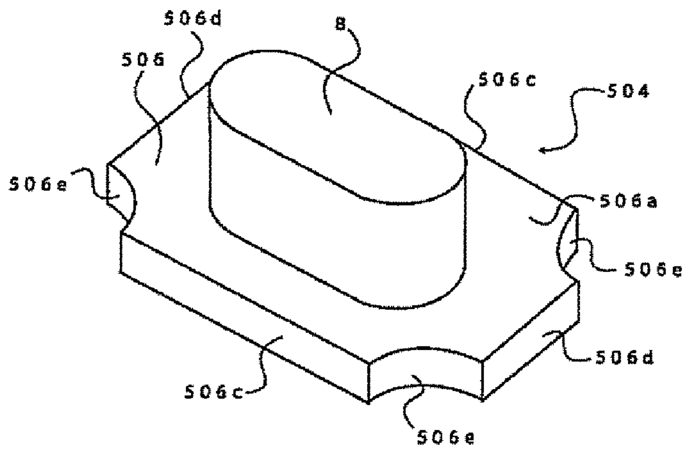
FIG. 9A is a perspective view of a base according to a third modification.
Figure 9B:
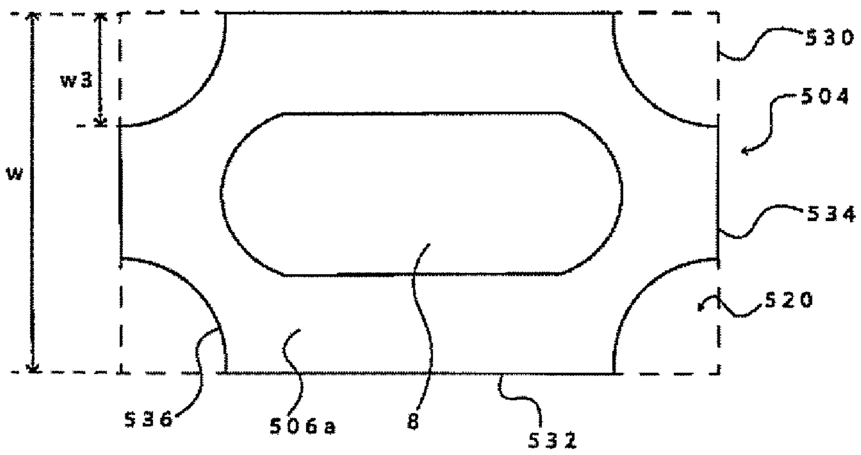
FIG. 9B is a top view of the base according to the third modification.

The shape of a base 506 of a core 504 according to a third modification will now be described with reference to FIG. 9A and FIG. 9B. FIG. 9A is a perspective view of the base according to the third modification. FIG. 9B is a top view of the base according to the third modification.

The base 506 according to the third modification has an upper surface 506*a*, a lower surface 506*b* opposite the upper surface 506*a*, side surfaces that connect the upper surface 506*a* and the lower surface 506*b* to each other, and notch surfaces 506*e*. The side surfaces include two side surfaces 506*c* in the longitudinal direction and two side surfaces 506*d* in the transverse direction. Each notch surface 506*e* is located between one of the side surfaces 506*c* in the longitudinal direction and one of the side surfaces 506*d* in the transverse direction and connects the side surfaces 506*c* in the longitudinal direction and the side surfaces 506*d* in the transverse direction to each other. The notch surface 506*e* is a curved surface and is curved into a convex shape extending in a direction from the outside of the core 504 toward the center of the core 504. The notch surface 506*e* is curved only in the horizontal direction of the inductor 1. That is, as illustrated in FIG. 9B, the base 506 has a substantially rectangular shape that is obtained by cutting four corners of a rectangle 530 along curves 536 and that has sides 532 in the longitudinal direction and sides 534 in the transverse direction when viewed from above. In this case, as illustrated in FIG. 9B, the sides 532 in the longitudinal direction are included in the shape of the side surfaces 506*c* of the base 506 in the longitudinal direction when viewed from above. As illustrated in FIG. 9A, the sides 534 in the transverse direction are included in the shape of the side surfaces 506*d* of the base 506 in the transverse direction when viewed from above. As illustrated in FIG. 9B, the curves 536 are included in the shape of the notch surfaces 506*e* when viewed from above.

To make a description of the shape of the base 506 easy to understand, regions that are defined by a part of the rectangle 530 and the curves 536 in FIG. 9A and FIG. 9B are referred to as notch regions 520.

A length w3 of the notch regions 520 in the transverse direction is equal to or less than half of the length w of the inductor in the transverse direction. However, when the length w3 is half of the length w, there are no side surface 506*d* of the base 506 in the transverse direction and no sides 534 of the substantially rectangular shape in the transverse direction viewed from above.

Effects

This enables the dimensions of the notch regions 520 to be increased. This means that a space in which each extended portion 14 extends from a position near the upper surface 506*a* of the base 506 toward the lower surface 506*b* is expanded, and the extended portion 14, 214, particularly, the extension portion 14*b*, 214*b* is easy to be contained in the corresponding notch region 520. That is, the extended portion 14, 214 that is disposed in the notch region 520 is likely to be prevented from being exposed from the surface of the body 16.

Other Modifications

According to the above embodiments and modifications, the bases 6, 306, 406, and 506 include the notch regions 20, 320, 420, and 520 at the four corners of the rectangles 30, 330, 430, and 530. However, this is not a limitation. For example, one or more notch regions may be formed at one, two, or three corners of each of the rectangles 30, 330, 430, and 530.

According to the above embodiments and modifications, the bases 6, 306, 406, and 506 have rectangle shapes having the longitudinal direction and the transverse direction. However, this is not a limitation. For example, the bases 6, 306, 406, and 506 may have square shapes.

According to the above embodiments and modifications, the bases 6, 306, 406, and 506 are disposed on first ends of the pillar-shaped portions 8 of the cores 4, 304, 404, and 504. However, this is not a limitation. A second base may be disposed on a second end of the pillar-shaped portion 8.

Figure 10:
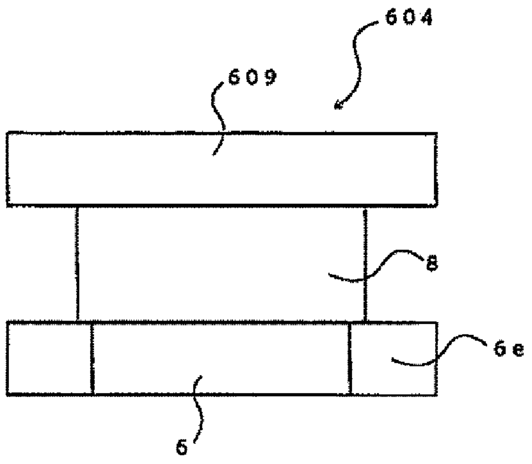
FIG. 10 is a side view of a core according to a modification.
Figure 11:
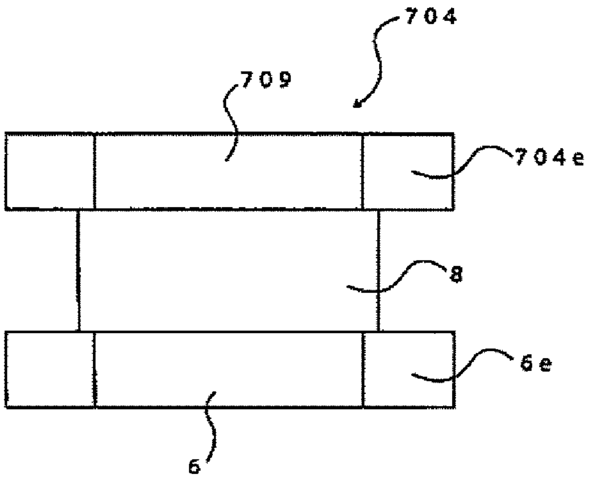
FIG. 11 is a side view of a core according to another modification.

For example, as illustrated in FIG. 10 that is a side view of a core according to a modification, the plate-like base 6 may be disposed on the first end of the pillar-shaped portion 8, and a plate-like second base 609 may be disposed on the second end of the pillar-shaped portion 8 to form a core 604. As illustrated in FIG. 11 that is a side view of a core according to another modification, the plate-like base 6 may be disposed on the first end of the pillar-shaped portion 8, a plate-like second base 709 may be disposed on the second end of the pillar-shaped portion 8, and the second base 709 may have the same shape as those of the above bases 6, 306, 406, and 506 to form a core 704. In this case, the shape of the base 6 and the shape of the second base 709 may differ from each other. For example, the number and/or positions of the notch surfaces 6*e* that are formed on the base 6 may differ from the number and/or positions of notch surfaces 704*e* that are formed on the second base 709.

In the inductor with this structure, the second base increases a region in which the core and the magnetic portion 2 are joined to each other and enables the strength of adhesion between the core and the magnetic portion to be increased. In the inductor with this structure, the second base that has the notch surfaces increases the region in which the core and the magnetic portion are joined to each other and enables the strength of adhesion between the core and the magnetic portion to be increased. In the inductor with this structure, the second base increases the inductance value of the inductor.

According to the above embodiments and modifications, the terminals 14*c*, 214*c* of the extended portions 14, 214 are bent with respect to the direction in which the extension portions 14*b*, 214*b* extend, and the wide surfaces extend along the lower surfaces of the bases 6, 206, 306, 406, and 506. However, this is not a limitation. For example, the terminals 14*c*, 214*c* may extend in the same direction as the extension portions 14*b*, 214*b*, and at least the end portions thereof may be exposed from the magnetic portion 2 and connected to the outer electrodes 18. That is, the terminals 14*c*, 214*c* may be parts of the extension portions 14*b*, 214*b*. With this structure, it is not necessary to bend the terminals 14*c*, 214*c* when the inductor is manufactured.

4. Manufacturing Method

A method of manufacturing the inductor according to the first embodiment will now be described.

The method of manufacturing the inductor according to the present embodiment includes (1) a process of forming the core 4, (2) a process of forming the coil 10, (3) a process of disposing the extended portions 14, (4) a process of molding and curing, (5) a process of forming an exterior resin, (6) a process of removing the exterior resin, and (7) a process of forming the outer electrodes 18.

The processes will now be described in detail.

Process of Forming Core 4

In this process, a cavity of a mold that can form the pillar-shaped portion 8 and the base 6 is filled with a mixture of the magnetic powder and the resin. For example, the mold has the cavity that includes a first portion having a shape and a depth for forming the base 6 and a second portion that is located along the bottom of the first portion and that has a shape and a depth for forming the pillar-shaped portion. The mixture of the magnetic powder and the resin is pressed in the mold approximately at a pressure of no less than 1 $t/cm^2$ and no more than 10 $t/cm^2$ (i.e., from 1 $t/cm^2$ to 10 $t/cm^2$) for several seconds to several minutes to form a core. At this time, the mixture of the magnetic powder and the resin may be heated at a temperature equal to or more than the softening temperature of the resin (for example, no less than 60° C. and no more than 150° C. (i.e., from 60° C. to 150° C.)) and pressed to form the core 4. Subsequently, the core is heated at a temperature equal to or more than the curing temperature of the resin (for example, no less than 100° C. and no more than 220° C. (i.e., from 100° C. to 220° C.)) and cured to obtain the core 4 that includes the plate-like base 6 and the pillar-shaped portion 8 on the base 6 that has the notch surfaces 6*e*. In some cases, the resin is not completely cured but semi-cured. In these cases, the temperature (for example, no less than 100° C. and no more than 220° C. (i.e., from 100° C. to 220° C.)) and the curing time (1 to 60 minutes) are adjusted for semi-curing in a desired state.

Process of Forming Coil 10

In this process, the conductive wire is wound around the pillar-shaped portion 8 of the core 4 that is obtained in the process of forming the core 4 to form the coil 10 that includes the winding portion 12 and the pair of extended portions 14 that extends from the winding portion 12. A rectangular wire that includes a coating layer and that has a substantially rectangular sectional shape is used as the conductive wire. The winding portion 12 is formed by winding the conductive wire so as to form the two steps such that the end portions of the conductive wire are located at the outer circumference and the conductive wire is continuous at the inner circumference. The winding portion 12 is wound around the pillar-shaped portion 8 such that the width direction of the wide surfaces 12*a* of the conductive wire is substantially parallel to the direction in which the pillar-shaped portion 8 extends, and one of the wide surfaces of the conductive wire faces the side surface of the pillar-shaped portion 8. In this way, the core 4 around which the coil 10 is wound is obtained. The coil 10 may be wound such that the inner circumferential surface of the winding portion 12 becomes parallel to the side surface of the pillar-shaped portion 8 of the core 4 after the conductive wire is wound so as to form the two steps such that the end portions of the conductive wire are located at the outer circumference and the conductive wire is continuous at the inner circumference.

Process of Disposing Extended Portions 14

In this process, the twisted portions 14*a* of the pair of extended portions 14 of the coil are first formed. The extended portions 14 are caused to extend in the direction perpendicular to the central axis B of the base 6 of the inductor (that is, the winding axis of the winding portion 12) and are disposed on the two notch surfaces 6*e* that are line-symmetrical to each other with respect to the central axis A of the inductor in the horizontal direction. These extensions (the extended portions 14) are twisted at an angle of no less than 90 degrees and no more than 180 degrees (i.e., from 90 degrees to 180 degrees) to the right or the left about the virtual center lines C of the end portions 28 of the winding portion 12 (twisting process). Subsequently, the twisted parts 26 of the extended portions 14 are bent about 90 degrees toward the base 6 about the axis D substantially perpendicular to the wide surfaces 28*a* of the end portions 28 of the winding portion 12 (bending process). The twisting process and the bending process may be performed substantially at the same time. Subsequently, the extended portions 14 the twisted portions 14*a* of which are formed by the twisting process and the bending process are caused to extend along the notch surfaces 6*e* of the base 6 from positions near the upper surface 6*a* of the base 6 toward the lower surface 6*b* to form the extension portions 14*b*. The end portions (the terminals 14*c*) of the extended portions 14 are bent with respect to the extension portions 14*b* such that the wide surfaces at the end portions are brought into contact with the lower surface 6*b* (the mounting surface 16*a* of the body 16) of the base 6. At this time, the end portions (the terminals 14*c*) of the extended portions 14 may be twisted with respect to the extension portions 14*b*.

Process of Molding and Curing

In this process, the core 4 around which the coil 10 is wound is inserted in the cavity of the mold such that the lower surface 6*b* of the base 6 faces the bottom surface of the cavity of the mold. After the core 4 around which the coil 10 is wound is inserted in the cavity of the mold, the cavity is filled with the mixture of the magnetic powder and the resin, and the mixture of the magnetic powder and the resin in the mold is heated at a temperature equal to or more than the softening point of the resin (for example, no less than 60° C. and no more than 150° C. (i.e., from 60° C. to 150° C.)), pressed approximately at a pressure of no less than 100 $kg/cm^2$ and no more than 500 $kg/cm^2$ (i.e., from 100 $kg/cm^2$ to 500 $kg/cm^2$), and further heated at a temperature equal to or more than the curing temperature of the resin (for example, no less than 100° C. and no more than 220° C. (i.e., from 100° C. to 220° C.)) for molding and curing. Consequently, the coil 10 and the core 4 are covered by the magnetic portion 2, and the body 16 are formed by the coil 10, the core 4, and the magnetic portion 2. The curing process may be performed after molding.

Process of Forming Exterior Resin

In this process, an exterior resin is formed on the entire surface of the body 16 that is obtained by the molding process and the curing process. The exterior resin is formed by applying a thermosetting resin such as an epoxy resin, a polyimide resin, or a phenolic resin, or a thermoplastic resin such as a polyethylene resin or a polyamide resin on the surface by, for example, a dipping method and curing the resin.

Process of Removing Exterior Resin

In this process, at positions at which the outer electrodes 18 are formed, the exterior resin and the coating layer and the adhesive layer of the conductive wire are partly removed from the body 16 on which the exterior resin is formed in the process of forming the exterior resin. The exterior resin, the coating layer, and the adhesive layer are removed by using a physical method such as a laser, a blasting process, or polishing.

Process of Forming Outer Electrodes 18

In this process, the outer electrodes 18 are formed by plating at the positions at which the exterior resin is partly removed in the process of removing the exterior resin. The outer electrodes 18 are formed by plating growth on the magnetic powder that is exposed by removing the exterior resin and on the extended portions 14 of the coil 10. The plating growth forms, for example, the first layer composed of nickel and the second layer composed of tin on the first layer.

The embodiments of the present disclosure are described above. The disclosure may change in a detailed structure. For example, the components according to the embodiments can be combined, and the order thereof can be changed without departing from the claimed scope and concept of the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

a body including a coil and a magnetic portion in which the coil is embedded; and a pair of outer electrodes disposed on a mounting surface of the body, wherein the coil includes a winding portion having two steps configured by winding a conductive wire that has a pair of wide surfaces around a winding axis, and a pair of extended portions that extends from the winding portion, each of the extended portions includes a twisted portion that is connected to the winding portion, such that the coil has a pair of twisted portions, the twisted portion is twisted about a virtual center line of an end portion of the winding portion, and a twisted part is bent toward the mounting surface about an axis substantially perpendicular to the pair of wide surfaces at the end portion, resulting in a composite shape with the shape twisted about the virtual center line and the shape bending toward the mounting surface about the axis substantially perpendicular to the pair of wide surface at the end portion, in a top view of the body, the pair of twisted portions are at two of four corners of the body, and end portions of the pair of extended portions near the mounting surface are electrically connected to the pair of outer electrodes.

2. The inductor according to claim 1, wherein the body includes a base that has an upper surface, a lower surface opposite to the upper surface, and side surfaces that connect the upper surface and the lower surface to each other, and a core that includes a pillar-shaped portion disposed on the upper surface of the base, and the pair of twisted portions is at one of the side surfaces of the base.

3. The inductor according to claim 1, wherein the body includes a base that has an upper surface, a lower surface opposite to the upper surface, and side surfaces that connect the upper surface and the lower surface to each other, and a core that includes a pillar-shaped portion disposed on the upper surface of the base, and the conductive wire is wound around the pillar-shaped portion.

4. The inductor according to claim 3, wherein the base, when viewed from above, has a substantially rectangular shape that is obtained by cutting a corner of a rectangle along a straight line and that has a longitudinal direction and a transverse direction, a side of the substantially rectangular shape in the longitudinal direction, when viewed from above, is a side included in a side surface that extends in the longitudinal direction among the side surfaces of the base, a side of the substantially rectangular shape in the transverse direction, when viewed from above, is a side included in a side surface that extends in the transverse direction among the side surfaces of the base, and the straight line is a line included in a notch surface of the base when viewed from above.

5. The inductor according to claim 1, wherein the pair of the twisted portions, when viewed from above, is substantially point-symmetrical to each other with respect to a winding axis of the winding portion.

6. The inductor according to claim 3, wherein the pair of the twisted portions, when viewed from above, is disposed on two notch surfaces of the base that are substantially line-symmetrical to each other with respect to a central axis of the inductor in a horizontal direction that is perpendicular to a winding axis of the winding portion.

7. The inductor according to claim 3, wherein the pillar-shaped portion includes a second base on an end portion opposite to an end portion on which the base is disposed.

8. The inductor according to claim 7, wherein the second base has an upper surface, a lower surface opposite to the upper surface, side surfaces that connect the upper surface and the lower surface to each other, and a notch surface that connects the upper surface and the lower surface to each other and that is located between the side surfaces.

9. The inductor according to claim 2, wherein the body includes a base that has an upper surface, a lower surface opposite to the upper surface, and side surfaces that connect the upper surface and the lower surface to each other, and the core includes a pillar-shaped portion disposed on the upper surface of the base, and the conductive wire is wound around the pillar-shaped portion.

10. The inductor according to claim 9, wherein the base, when viewed from above, has a substantially rectangular shape that is obtained by cutting a corner of a rectangle along a straight line and that has a longitudinal direction and a transverse direction, a side of the substantially rectangular shape in the longitudinal direction, when viewed from above, is a side included in a side surface that extends in the longitudinal direction among the side surfaces of the base, a side of the substantially rectangular shape in the transverse direction, when viewed from above, is a side included in a side surface that extends in the transverse direction among the side surfaces of the base, and the straight line is a line included in a notch surface of the base when viewed from above.

11. The inductor according to claim 2, wherein the pair of the twisted portions, when viewed from above, is substantially point-symmetrical to each other with respect to a winding axis of the winding portion.

12. The inductor according to claim 3, wherein the pair of the twisted portions, when viewed from above, is substantially point-symmetrical to each other with respect to a winding axis of the winding portion.

13. The inductor according to claim 4, wherein the pair of the twisted portions, when viewed from above, is substantially point-symmetrical to each other with respect to a winding axis of the winding portion.

14. The inductor according to claim 9, wherein the pair of the twisted portions, when viewed from above, is substantially point-symmetrical to each other with respect to a winding axis of the winding portion.

15. The inductor according to claim 10, wherein the pair of the twisted portions, when viewed from above, is substantially point-symmetrical to each other with respect to a winding axis of the winding portion.

16. The inductor according to claim 4, wherein the pair of the twisted portions, when viewed from above, is disposed on two notch surfaces of the base that are substantially line-symmetrical to each other with respect to a central axis of the inductor in a horizontal direction that is perpendicular to a winding axis of the winding portion.

17. The inductor according to claim 9, wherein the pair of the twisted portions, when viewed from above, is disposed on two notch surfaces of the base that are substantially line-symmetrical to each other with respect to a central axis of the inductor in a horizontal direction that is perpendicular to a winding axis of the winding portion.

18. The inductor according to claim 10, wherein the pair of the twisted portions, when viewed from above, is disposed on two notch surfaces of the base that are substantially line-symmetrical to each other with respect to a central axis of the inductor in a horizontal direction that is perpendicular to a winding axis of the winding portion.

19. The inductor according to claim 4, wherein the pillar-shaped portion includes a second base on an end portion opposite to an end portion on which the base is disposed.

20. The inductor according to claim 6, wherein the pillar-shaped portion includes a second base on an end portion opposite to an end portion on which the base is disposed.

* * * * *